United States Patent Office 3,526,825
Patented Sept. 1, 1970

3,526,825
REGULATION OF SMALL ELECTRICAL POTENTIALS OVER A WIDE LOAD RANGE
Robert M. Haines, Placentia, Calif., assignor to Union Oil Company of California, Los Angeles, Calif., a corporation of California
Filed June 1, 1967, Ser. No. 642,840
Int. Cl. G05f 1/46
U.S. Cl. 323—16                                   12 Claims

ABSTRACT OF THE DISCLOSURE

A voltage regulation circuit comprising two Zener diode networks containing diodes having similar current-potential characteristics connected in opposed polarity across which a D.C. potential is applied to provide a stabilized voltage output in the millivolt range.

---

This invention relates to the use of Zener diodes to provide a voltage stabilized output in the millivolt range and a range up to 300 milliamps or more depending on the transistors used.

Voltage stabilization provided by glow tube regulators, Zener diodes and by numerous electronic regulator circuit configurations has become fairly well standardized. One drawback in the use of present regulators is that as the current is increased there is a small, but definite rise in voltage over the permissible range of current.

Circuits employing electron tubes have been known to oscillate and produce ripples. This can produce problems which may be overcome but require careful attention to details such as heater filaments, common leads and to the use of special tubes which are expensive. Usually, more complicated circuitry is required to give the best results.

Zener diodes are used in circuits employing transistors which regulate by a controlled dissipation of voltage in excess of a desired amount. Control is achieved by fixing the base voltage of the transistor at the desired level of the collector voltage by means of a Zener diode. When the collector voltage of the transistor equals the breakdown voltage of the Zener diode, the transistor is cut off. Electrons then drain from the transistor until the base voltage is less than the cut-off voltage of the diode; the cycle then repeats. The Zener diode thus teeters on the edge of conduction and cut-off to maintain the output at a predetermined value. Under these conditions, Zener diodes may be used to control voltages in the 2–200 volt range. However, because the conduction and cut-off values of a diode vary slightly with load current, regulated output of less than about one volt cannot be achieved, and obviously the accuracy of the regulation cannot be extended into the millivolt range.

It is therefore an object of the invention to provide a Zener diode controlled voltage regulator capable of providing a regulated millivolt output over a wide milliamp range.

Another object is to provide a Zener diode circuit arrangement in which the conduction and cut-off voltages of a diode pair is stabilized.

Figure 1:
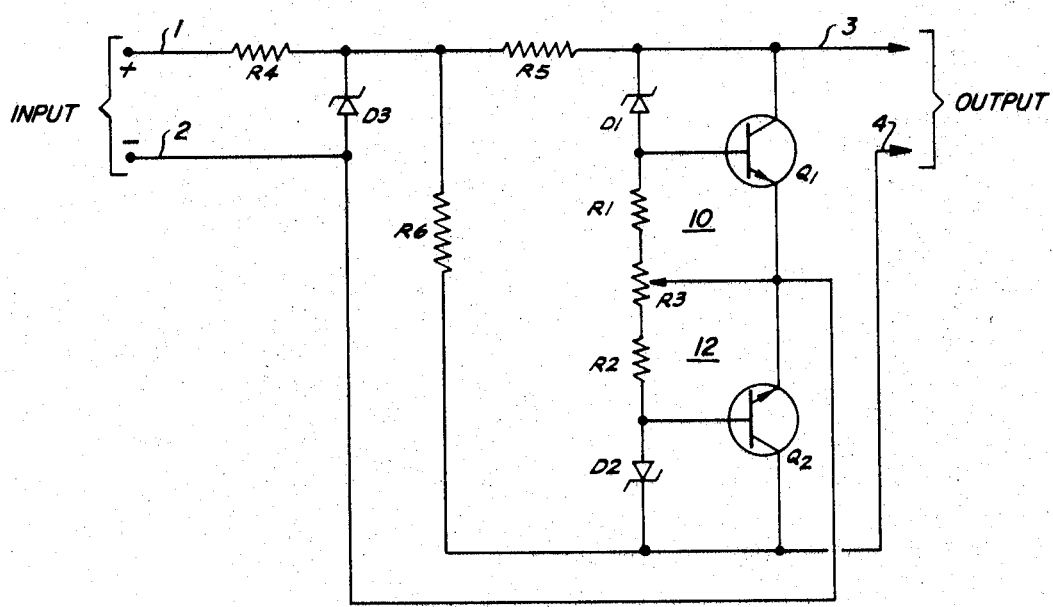
Figure 2:
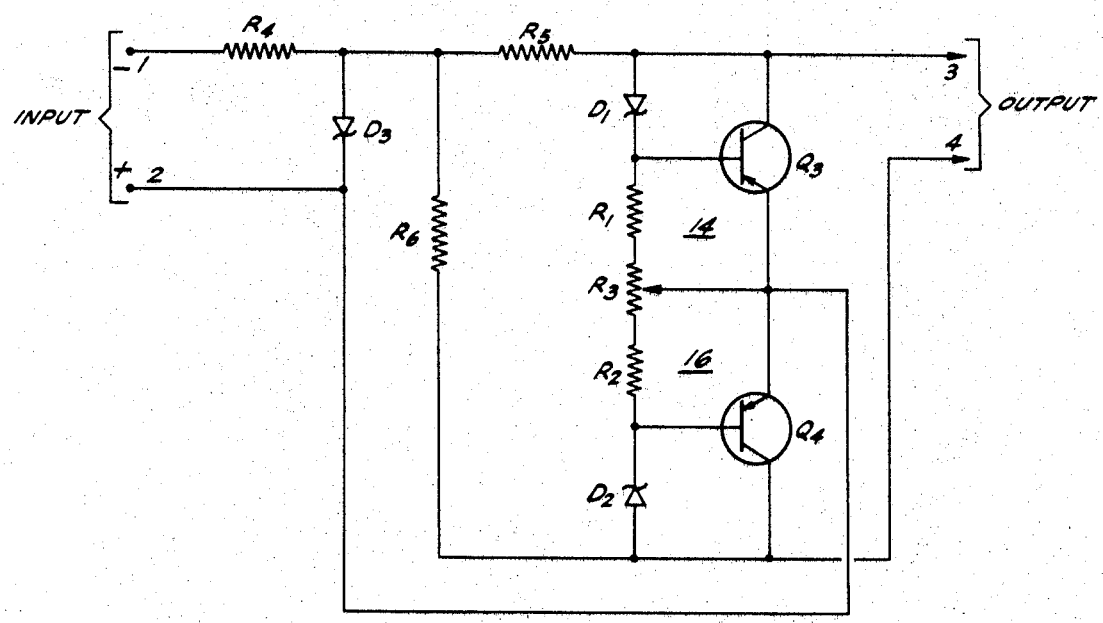

Further objects of the invention will become apparent from the description and accompanying drawings, in which the same numerals refer to corresponding parts and wherein:

FIG. 1 illustrates a schematic diagram of an electrical circuit of one embodiment of this invention; and FIG. 2 illustrates a schematic diagram of the electrical circuit comprising another embodiment of this invention.

The objects of the invention are attained with a voltage regulation circuit in which two opposed Zener networks are connected to provide a stabilized voltage output resulting from the difference in potential across the two networks. A stabilized voltage within the millivolt range is obtained by selecting the diodes for Zener potential similarity and applying their output to the common connected emitters of a transistor pair and through a resistance network which is preferably variable, to the respective bases of the transistors. It has been found that this arrangement stabilizes the conduction and cut-off values of the Zener diode to a value intermediate between them and this permits the base voltage of the transistor pair to be precisely fixed at the desired level.

As shown in FIG. 1, Zener network 10 is comprised of Zener diode $D_1$, npn transistor $Q_1$ and resistor $R_1$. Zener network 12 is comprised of Zener diode $D_2$, npn transistor $Q_2$ and resistor $R_2$. In each network, the anode of the diode, the base of the transistor and one terminal of the resistor are commonly connected. The cathode of each diode is connected in common with the collector of its respective transistor. Zener networks 10 and 12 are coupled by commonly connecting the emitters of transistors $Q_1$ and $Q_2$ to the variable leg of potentiometer $R_3$, with the output terminals of the potentiometer $R_3$ being connected to resistors $R_1$ and $R_2$ respectively. The cathode of Zener diode $D_1$ is connected to output terminal 3 and the cathode of Zener diode $D_2$ is connected to output terminal 4. The commonly connected emitters of transistors $Q_1$ and $Q_2$ and the variable leg of potentiometer $R_3$ are connected to negative terminal 2 of a D.C. power source. The cathodes of diode $D_1$ and $D_2$ are commonly connected to one terminal of resistor $R_4$ through resistors $R_5$ and $R_6$, respectively. The other terminal of resistor $R_4$ is connected to positive terminal 1 of the D.C. power source. Zener diode $D_3$ is provided to stabilize the voltage input to the regulation circuit, and is attached by connecting the cathode of the diode to the output terminal of resistor $R_4$, and the anode to negative terminal 2.

In FIG. 2, Zener network 14 is comprised of Zener diode $D_1$, pnp transistor $Q_3$ and resistor $R_1$. Zener network 16 is comprised of Zener diode $D_2$, pnp transistor $Q_4$ and resistor $R_2$. In each network, the cathode of the diode, the base of the transistor and one terminal of the resistor are commonly connected. The anode of each diode is directly connected with the collector of its respective transistor. Zener networks 14 and 16 are coupled by commonly connecting the emitters of transistors $Q_3$ and $Q_4$ to the variable leg of potentiometer $R_3$, with the output terminals of the potentiometer $R_3$ being connected to resistors $R_1$ and $R_2$, respectively. The anode of Zener diode $D_1$ is connected to the output terminal 3, and the anode of Zener diode $D_2$ is connected to the output terminal 4. The commonly connected emitters of transistors $Q_3$ and $Q_4$ and the variable leg of potentiometer $R_3$ are connected to positive terminal 2 of a D.C. power source. The anodes of $D_1$ and $D_2$ are commonly connected to one terminal of resistor $R_4$ through resistors $R_5$ and $R_6$, respectively. The other terminal of resistor $R_4$ is connected to negative terminal 1 of the D.C. power source. Zener diode $D_3$ is provided to stabilize the voltage input to the regulation circuit, and is attached by connecting the anode of the diode to the output terminal of resistor $R_4$, and the cathode to positive terminal 2.

In operation, a D.C. potential difference is applied across terminals 1 and 2 of the regulator circuit illustrated in the attached drawings, and current flowing through the circuit is divided between Zener networks 10 and 12. The current supplied to the Zener networks, flows through Zener diode $D_1$ and the collector of transistor $Q_1$ or $Q_3$, and Zener diode $D_2$ and the collector of transistor $Q_2$ or $Q_4$, respectively. Each of Zener diodes impart a constant potential across the collector and base of their respective transistors, and this potential is relatively unaffected by minor fluctuations in the current flowing therethrough. The current flow through the diodes $D_1$ and $D_2$ is controlled by the values of resistors $R_1$, $R_2$ and potentiometer $R_3$, such that the potential drop across diode $D_1$ is slightly different than the potential drop across diode $D_2$. The output signal, i.e., the potential difference between terminals 3 and 4, is essentially the difference between the potential drop across Zener diode $D_1$ and Zener diode $D_2$. Hence, by adjusting potentiometer $R_3$, a limited control over the value of the output voltage can be attained.

When a small load is applied across the output terminals, the current through each diode decreases slightly. This decrease in turn lowers the current to the base of each of the transistors and accordingly, restricts the current flow through the transistors, thus making more current available for the load. Since the current through the diodes changes only slightly, no noticeable change in the voltage drop across the Zener diodes appears, and hence, a constant voltage regulation is attained.

In an exemplary circuit, a 22 volt D.C. input potential is applied to a regulator circuit as illustrated in FIG. 1. Smoothing is provided by the diode $D_3$ and 200 ohms resistor $R_4$. If the ripple factor of the input voltage is sufficiently low, $D_3$ and $R_4$ can be omitted from the circuit.

The voltage input is fed through resistors $R_1$, $R_2$ and variable resistor $R_3$ having resistance of 1K, 1K and 2.5K ohms respectively, and then to the base of each transistor $Q_1$ and $Q_2$. Both emitters are fed directly from the negative input.

Since diodes $D_1$ and $D_2$ are selected for their Zener potential similarity, a slight but constant current difference is established between the networks containing $R_1$, $D_1$ and $Q_1$, and $R_2$, $D_2$ and $Q_2$. By maintaining this current difference constant, the conduction and cut-off points of $D_1$ and $D_2$ are stabilized.

The resistor $R_3$ provides for limited adjustment of Zener potentials and control of the operating potentials of transistors $Q_1$ and $Q_2$, thus providing limited adjustment of the output voltage.

This circuit is able to absorb current while maintaining its potential; to equalize the temperature of the diodes $D_1$ and $D_2$, and the transistors $D_1$ and $Q_2$, they are placed in a common heat sink such as an aluminum block or other device. If the diodes and transistors are manufactured from a common chip this also suffices as a temperature compensating heat sink.

Using the above resistance values, the output is 20 millivolts at 34 ma. with a deviation of less than 0.5 millivolt.

The npn transistors used are manufactured by the R.C.A. Company and others as No. 2N1306; pnp transistors may be employed equally well. Preferably, the transistors employed should have a faster switching time than the 2N1306, i.e., in the order of $10^{-9}$ seconds.

If pnp transistors are used instead, the diodes $D_1$, $D_2$ and $D_3$ will be reversed as will the polarity of the input signal.

Diodes $D_1$ and $D_2$ are manufactured by the International Rectifier Company as No. 1N957A. Diode $D_3$ is manufactured by the General Electric Company and others as No. 1N1773. Of course other diode types may be employed.

I claim:

1. A voltage regulation circuit comprising two Zener networks connected in opposed polarity, each network containing a Zener diode having similar potential-current characteristics, a resistor means and a transistor having a base, an emitter and a collector, said Zener diode being directly connected across the base and collector of said transistor in each network, the emitters of said transistors being commonly connected in closed circuit with the base of each transistor through said resistor means in each network; means for applying a DC potential across each of said Zener networks; and means for regulating the current flow through each network whereby a stabilized potential in the millivolt range is produced across the combined Zener networks.

2. The circuit defined in claim 1 in which the temperature of the diodes and transistors are equalized by placing them in a common heat sink.

3. The circuit defined in claim 1 wherein said means for regulating said current flow is a potentiometer connected between said Zener networks.

4. The circuit defined in claim 1 wherein said means for applying said D.C. potential include an additional Zener diode connected across the D.C. potential source.

5. A voltage regulation circuit comprising:
   a first Zener network containing a first Zener diode having an anode and a cathode, a first npn transistor having a base, an emitter and a collector, and a first resistor means, the base of said transistor being directly connected to the anode of said diode and commonly connected to one terminal of said first resistor means, and the cathode of said diode being directly connected to the collector of said transistor;
   a second Zener network containing a second Zener diode having a potential-current characteristic similar to said first Zener diode and having an anode and a cathode, a second npn transistor having a base, an emitter and a collector, and a second resistor means, the base of said transistor being directly connected to the anode of said diode and commonly connected to one terminal of said second resistor means, and the cathode of said diode being directly connected to the collector of said transistor;
   a first conducting means for commonly connecting the emitters of said first and second transistors and a second terminal of each of said first and second resistor means;
   a third resistor means having one terminal connected to the cathode of said first diode;
   a fourth resistor means having one terminal connected to the cathode of said second diode;
   a potential input means having positive and negative conductors for connecting said voltage regulation circuit to a D.C. voltage source, said positive conductor being connected to the second terminals of said third and fourth resistor means, and said negative conductor being connected to said first conducting means;
   output terminal means connected to the cathode of said first and second diodes;
   whereby a stabilized output potential in the millivolt range is obtained across said output terminals.

6. The voltage regulation circuit defined in claim 5 wherein a potentiometer is connected between said first and second resistor means and the variable leg of said potentiometer is connected to said first conducting means.

7. The voltage regulation circuit defined in claim 5 in which the temperature of the diodes and transistors are equalized by placing them in a common heat sink.

8. The voltage regulation circuit defined in claim 5 wherein said potential input means include an additional Zener diode having an anode and a cathode and connected across said D.C. potential source, the anode of said diode being connected to said negative conductor and the cathode of said diode being connected to said positive conductor; whereby a constant potential is supplied to said voltage regulation circuit.

9. A voltage regulation circuit comprising:
   a first Zener network containing a first Zener diode having a cathode and an anode, a first pnp transistor having a base, an emitter and a collector, and a first resistor means, the base of said transistor being directly connected to the cathode of said diode and commonly connected to one terminal of said first resistor means, and the anode of said diode being directly connected to the collector of said transistor;
   a second Zener network containing a second Zener diode having a potential-current characteristic similar to said first Zener diode and having a cathode and an anode, a second pnp transistor having a base, an emitter and a collector, and a second transistor means, the base of said transistor being directly connected to the cathode of said diode and commonly connected to one terminal of said second resistor means, and the anode of said diode being directly connected to the collector of said transistor;

a first conducting means for commonly connecting the emitters of said first and second transistors and a second terminal of each of said first and second resistor means;

a third resistor means having one terminal connected to the anode of said first diode;

a fourth resistor means having one terminal connected to the anode of said second diode;

a potential input means having negative and positive conductors for connecting said voltage regulation circuit to a D.C. potential source, said negative conductor being connected to the second terminals of said third and fourth resistor means, and said positive conductor being connected to said first conducting means;

output terminal means connected to the anode of said first and second diodes;

whereby a stabilized output potential in the millivolt range is obtained across said output terminals.

10. The voltage regulation circuit defined in claim 9 wherein a potentiometer is connected between said first and second resistor means and the variable leg of said potentiometer is connected to said first connecting means.

11. The voltage regulation circuit defined in claim 9 in which the temperature of the diodes and transistors are equalized by placing them in a common heat sink.

12. The voltage regulation circuit defined in claim 9 wherein said potential input means include an additional Zener diode having an anode and a cathode and connected across said D.C. potential source, the anode of said diode being connected to said negative conductor and the cathode of said diode being connected to said positive conductor; whereby a constant potential is supplied to said voltage regulation circuit.

References Cited

UNITED STATES PATENTS 3,262,066  7/1966  Trilling _____ 330—69

J D MILLER, Primary Examiner

A. D. PELLINEN, Assistant Examiner

U.S. Cl. X.R.

323—22

UNITED STATES PATENT OFFICE
CERTIFICATE OF CORRECTION

Patent No. 3,526,825          Dated September 1, 1970

Inventor(s) Robert M. Haines

It is certified that error appears in the above-identified patent and that said Letters Patent are hereby corrected as shown below:

Claim 10, column 6, line 4, the word --connecting-- should be -- conducting --.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents